(12) United States Patent
Harris et al.

(10) Patent No.: US 11,254,371 B2
(45) Date of Patent: Feb. 22, 2022

(54) TAILGATE OPEN POSITION ADJUSTMENT SYSTEM

(71) Applicant: Toyota Motor Engineering & Manufacturing North America, Inc., Plano, TX (US)

(72) Inventors: Ryan C. Harris, Saline, MI (US); Scott L. Frederick, Brighton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 275 days.

(21) Appl. No.: 16/706,453

(22) Filed: Dec. 6, 2019

(65) Prior Publication Data

US 2021/0171127 A1  Jun. 10, 2021

(51) Int. Cl.
| | | |
|---|---|---|
| B62D 33/03 | (2006.01) |
| B62D 33/027 | (2006.01) |
| E05F 15/627 | (2015.01) |
| B60P 1/26 | (2006.01) |

(52) U.S. Cl.
CPC ............ *B62D 33/0273* (2013.01); *B60P 1/26* (2013.01); *B62D 33/03* (2013.01); *E05F 15/627* (2015.01); *E05Y 2201/654* (2013.01); *E05Y 2900/546* (2013.01)

(58) Field of Classification Search
CPC ....... B62D 33/0273; B62D 33/03; B60P 1/26; E05F 15/627; E05Y 2201/654; E05Y 2900/546; E05Y 2900/544
USPC ....................................................... 296/57.1
See application file for complete search history.

(56) References Cited

U.S. PATENT DOCUMENTS

| | | | |
|---|---|---|---|
| 4,601,485 A | 7/1986 | Furchak | |
| 4,813,842 A | 3/1989 | Morton | |
| 5,954,383 A | 9/1999 | Beck et al. | |
| 6,068,321 A * | 5/2000 | Ooms ................ | B62D 33/0273 296/146.4 |
| 6,196,609 B1 | 3/2001 | Bowers | |
| 7,000,908 B2 | 2/2006 | Costello et al. | |
| 7,287,803 B2 | 10/2007 | Koneval et al. | |
| 7,309,094 B2 | 12/2007 | Norfleet | |
| 7,422,262 B2 * | 9/2008 | Marshall ............ | B62D 33/0273 296/57.1 |
| 7,631,922 B2 | 12/2009 | Armstrong et al. | |

(Continued)

FOREIGN PATENT DOCUMENTS

WO     2017065704 A1     4/2017

*Primary Examiner* — Stephen T Gordon
(74) *Attorney, Agent, or Firm* — Snell & Wilmer LLP

(57) ABSTRACT

Methods and systems for adjusting a position of a tailgate of a vehicle. The system includes a cable connecting the tailgate to a spool configured to turn in a first direction to wind the cable, and turn in a second direction to unwind the cable. The system includes a cable release located between the spool and the tailgate, the cable release, when in the unengaged state, allowing the cable to move through the cable release when the spool turns in the first direction, and preventing movement of the cable through the cable release when force is applied to the cable from the tailgate, and the cable release, when in the engaged state, allowing the cable to move through the cable release when the spool turns in the second direction. The system includes a button configured to toggle the cable release between the engaged state and the unengaged state.

20 Claims, 5 Drawing Sheets

(56) References Cited

U.S. PATENT DOCUMENTS

| | | |
|---|---|---|
| 8,684,441 B2 | 4/2014 | Kerr, III |
| 9,637,967 B2 | 5/2017 | Hunt et al. |
| 9,902,306 B1 | 2/2018 | Foss et al. |
| 10,239,567 B1 | 3/2019 | Parrish |
| 2016/0144758 A1* | 5/2016 | Knapp .................... B60P 1/435 414/537 |
| 2018/0022174 A1 | 1/2018 | Stojkovic et al. |
| 2018/0290693 A1 | 10/2018 | Ogden et al. |

* cited by examiner

CABLE RELEASE

CABLE RELEASE

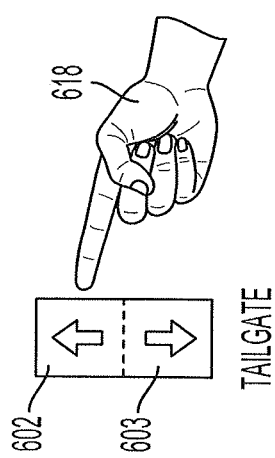
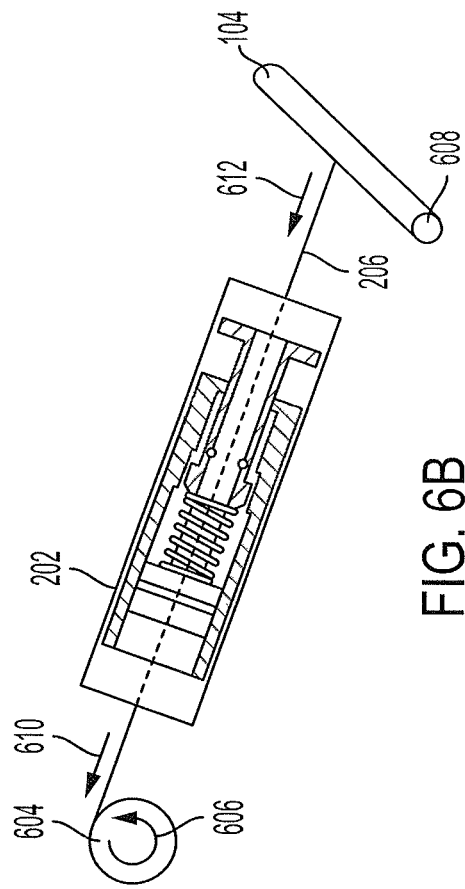
FIG. 6A
FIG. 6B
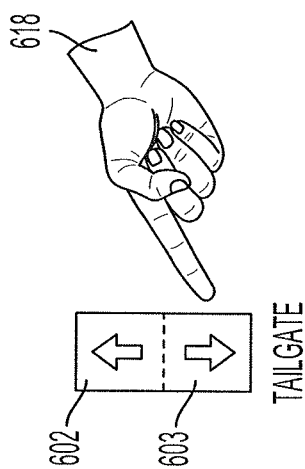
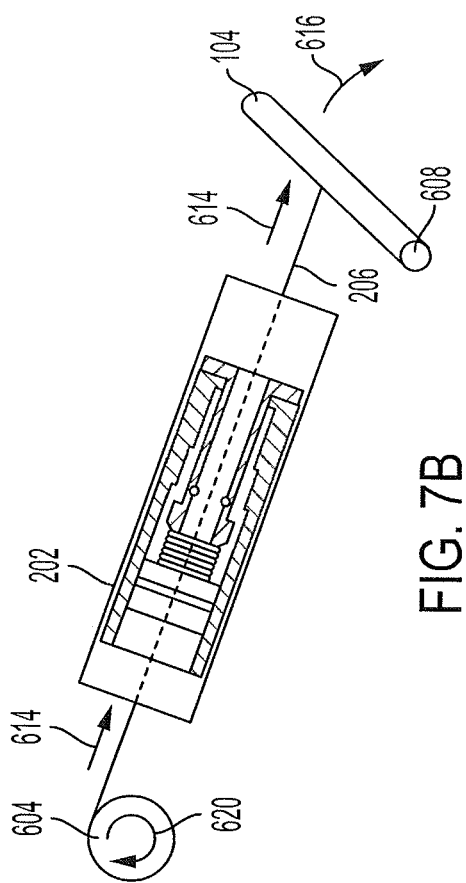
FIG. 7A
FIG. 7B

TAILGATE OPEN POSITION ADJUSTMENT SYSTEM

BACKGROUND

1. Field

This specification relates to a system and a method for adjusting the open position of a vehicle tailgate.

2. Description of the Related Art

Some vehicles, such as trucks, include cargo areas and have tailgates configured to open and close access to these cargo areas. Conventional tailgates may be fully opened or fully closed. When fully closed, these conventional tailgates may be locked in place by one or more latches. In some situations, cargo stored in the vehicle may exceed the size of the cargo area while the tailgate is closed, and users of the vehicle must leave the tailgate fully open and leave the cargo vulnerable to falling out of the cargo area, or tie down the cargo to the cargo area. However, some cargo is not conducive to being tied down or otherwise secured in the cargo area, and this tying down creates an often-cumbersome extra step for users of the vehicles. Thus, there is a need for improved tailgate systems for vehicles.

SUMMARY

What is described is a system for adjusting a position of a tailgate of a vehicle. The system includes a cable connecting the tailgate to a spool, the spool configured to turn in a first direction to wind the cable around the spool, and turn in a second direction to unwind the cable from the spool. The system also includes a cable release located between the spool and the tailgate, the cable passing through the cable release, the cable release configured to be in an engaged state or an unengaged state, the cable release, when in the unengaged state, allowing the cable to move through the cable release when the spool turns in the first direction to wind the cable around the spool, and preventing movement of the cable through the cable release when force is applied to the cable from the tailgate, and the cable release, when in the engaged state, allowing the cable to move through the cable release when the spool turns in the second direction to unwind the cable around the spool. The system also includes a button coupled to the cable release and configured to toggle the cable release between the engaged state and the unengaged state when the button is pressed.

Also described is a vehicle with an adjustable tailgate. The vehicle includes a cable connecting the tailgate to a spool, the spool configured to turn in a first direction to wind the cable around the spool, and turn in a second direction to unwind the cable from the spool. The vehicle also includes a cable release located between the spool and the tailgate, the cable passing through the cable release, the cable release configured to be in an engaged state or an unengaged state, the cable release, when in the unengaged state, allowing the cable to move through the cable release when the spool turns in the first direction to wind the cable around the spool, and preventing movement of the cable through the cable release when force is applied to the cable from the tailgate, and the cable release, when in the engaged state, allowing the cable to move through the cable release when the spool turns in the second direction to unwind the cable around the spool. The vehicle also includes a button coupled to the cable release and configured to toggle the cable release between the engaged state and the unengaged state when the button is pressed.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIGS. 6A-6B illustrate a tailgate button and movement of the tailgate from an open position to a closed position, according to various embodiments of the invention.

FIGS. 7A-7B illustrate a tailgate button and movement of the tailgate from a closed position to an open position, according to various embodiments of the invention.

DETAILED DESCRIPTION

Disclosed herein are systems, vehicles, and methods for adjusting an open position of a tailgate of a vehicle. By being able to selectively position the tailgate at multiple possible interim locations between the fully open and fully closed positions, the systems and methods described herein allow for greater convenience of the users of the vehicles for securing their cargo, and also allows for greater safety of securing the cargo within the cargo area of the vehicle.

The systems and methods described herein provide for a simple solution for the users of the vehicles to conveniently adjust and maintain the position of the tailgate. The systems and methods described herein also include relatively few components, and may be retrofitted onto existing vehicles, or may be included in newly manufactured vehicles without significantly increasing vehicle build complexity or vehicle material costs.

Figure 1:
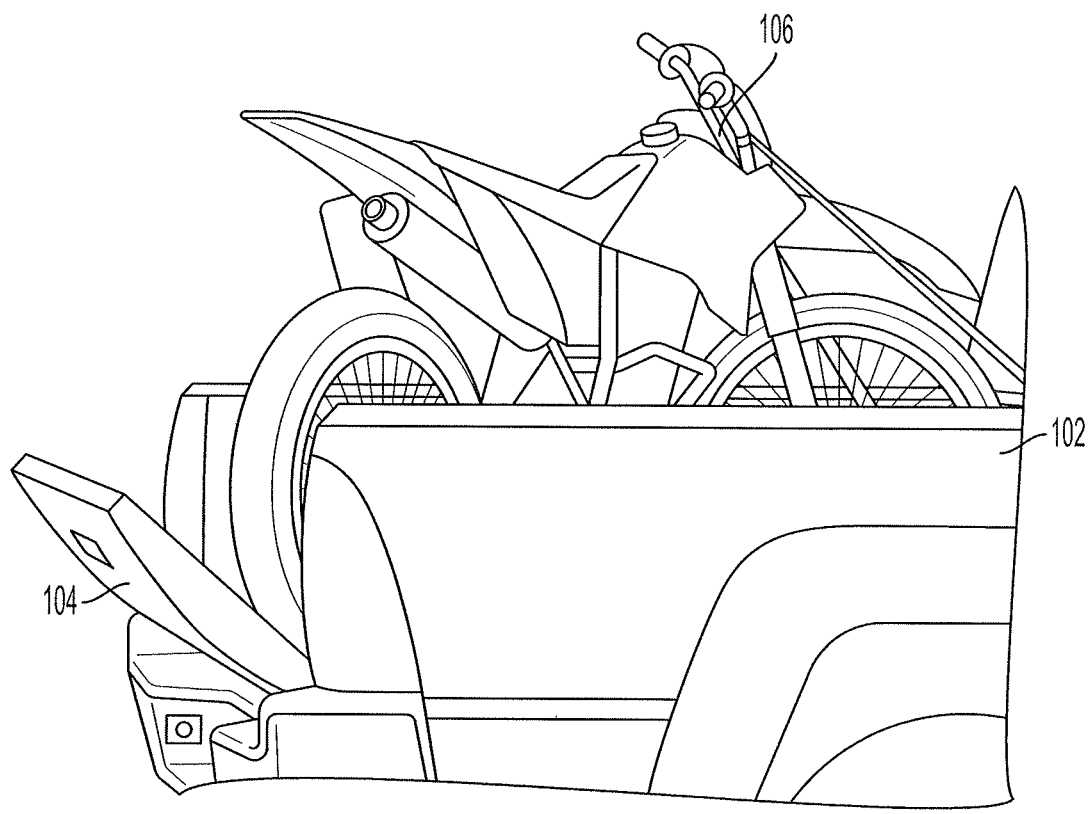
FIG. 1 illustrates a vehicle carrying cargo, according to various embodiments of the invention.

FIG. 1 illustrates a vehicle 102 carrying cargo 106. The vehicle 102 has a tailgate 104 that is capable of being in a fully open position, a fully closed position, and any position therebetween. The fully open position may be a position where cargo 106 is able to freely enter or exit the vehicle 102 along a horizontal plane, and the fully closed position may be a position where cargo 106 is unable to freely enter or exit the vehicle 102 along the horizontal plane and the tailgate 104 is engaged with a locking or securing mechanism of the vehicle 102.

The vehicle 102 is a conveyance capable of transporting a person, an object, or a permanently or temporarily affixed apparatus. The vehicle 102 may have an automatic or manual transmission. The vehicle 102 may be a self-propelled wheeled conveyance, such as a car, sports utility vehicle, truck, bus, van or other motor or battery driven vehicle. For example, the vehicle 102 may be an electric vehicle, a hybrid vehicle, a plug-in hybrid vehicle, a fuel cell vehicle, or any other type of vehicle that includes a motor/generator.

The vehicle 102 may be capable of non-autonomous operation or semi-autonomous operation or autonomous operation. That is, the vehicle 102 may be driven by a human driver or may be capable of self-maneuvering and navigating without human input. A vehicle operating semi-autonomously or autonomously may use one or more sensors and/or a navigation unit to drive autonomously.

The tailgate 104 may be selectively positioned so that the tailgate supports some of the weight of the cargo 106 in the vehicle 102. By supporting some of the weight of the cargo 106 in the vehicle 102, the tailgate may prevent the cargo 106 from moving within the vehicle 102 (e.g., within a truck bed of the vehicle) or from falling out of the vehicle 102.

Figure 2:
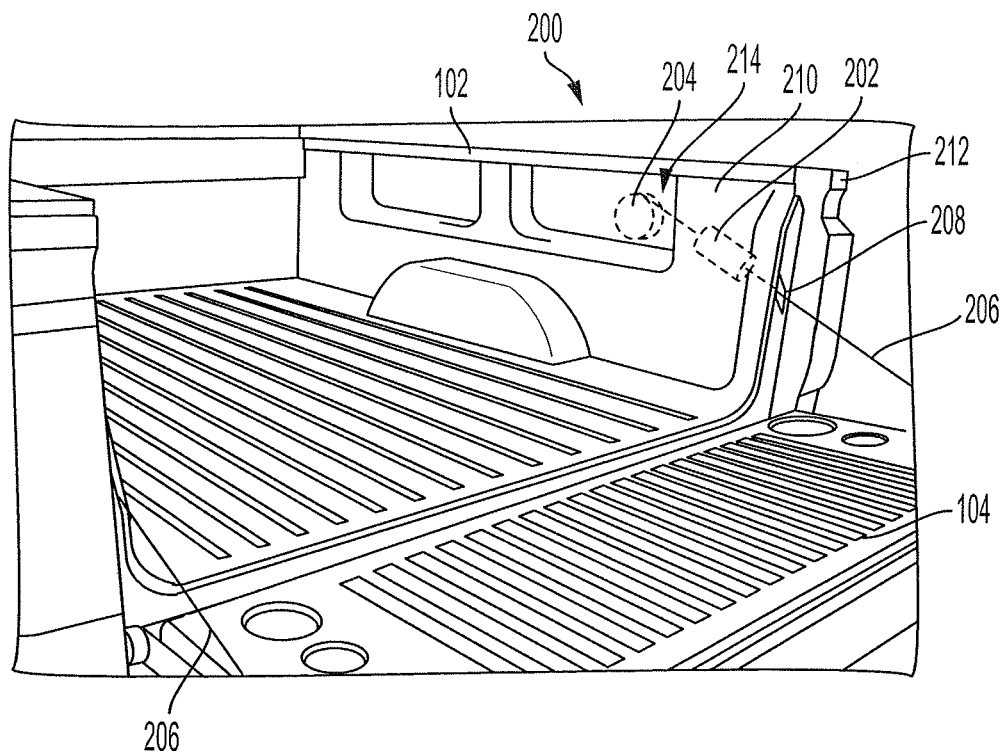
FIG. 2 illustrates a perspective view of a vehicle tailgate in a partially open position, according to various embodiments of the invention.

FIG. 2 illustrates the tailgate open position adjustment system 200. The system 200 may be an integrated part of the vehicle 102 and preinstalled by the manufacturer of the vehicle 102, or the system 200 may be installed after manufacturing of the vehicle 102. In this way, the system 200 may include the vehicle 102 and the tailgate 104 of the vehicle 102, or may be separate from the vehicle 102 and the tailgate 104 of the vehicle 102.

The system 200 includes a spool 204 configured to wind (by rotating about an axis in a first direction) to wrap a cable 206 connected to the spool 204 around the spool 204. The spool 204 is also configured to unwind (by rotating about the axis in a second direction opposite the first direction) to unwrap the cable 206 around the spool 204.

The cable 206 is connected on one end to the spool 204 and connected on the other end to the tailgate 104. When the spool 204 winds, the winding of the spool 204 causes the cable 206 to wrap around the spool 204 and also causes the tailgate 104 to be lifted toward the spool 204, thereby moving the tailgate 104 from an open position toward a closed position. When the spool 204 unwinds, the unwinding of the spool 204 causes the cable 206 to unwrap around the spool 204 and also causes the tailgate 104 to fall away from the spool 204 (by gravitational force) from a closed position toward an open position.

In some embodiments, the spool 204 includes a spring (e.g., a torsion spring) that urges the spool 204 in the first direction to wind the cable 206 around the spool 204. In some embodiments, the spool 204 is connected to an actuator configured to wind or unwind the spool 204. In some embodiments, the spool 204 is wound manually by a user using a crank.

The system 200 also includes a cable release 202. The cable 206 passes through the cable release 202 and the cable release 202 regulates movement of the cable 206 through the cable release 202. The cable release 202 is located between the spool 204 and the tailgate 104. The cable release 202 is capable of being in an engaged state or an unengaged state.

In the unengaged state, the cable release 202 allows for the winding of the spool 204 (and accordingly movement of the tailgate 104 from the open position toward the closed position) and prevents unwinding of the spool 204 (and accordingly prevents movement of the tailgate 104 from the closed position toward the open position). That is, when the cable release 202 is in the unengaged state, the tailgate 104 may freely move from the open position toward the closed position, but may not freely move from the closed position toward the open position. Thus, a user of the vehicle 102 may load cargo (e.g., cargo 106) into the vehicle 102, move the tailgate 104 to a partially closed position (from the open position toward the closed position), and the tailgate 104 will stay in the partially closed position and assist in securing the cargo within the vehicle 102. When the spool 204 is a spring-loaded spool, the spring force may be tuned with the weight of the tailgate 104 so that the spring force does not overcome the weight of the tailgate 104 and automatically close the tailgate 104 with no force imparted on the tailgate 104 by a user toward the closed position.

In the engaged state, the cable release 202 allows for the unwinding of the spool 204 (and accordingly movement of the tailgate 104 from the closed position toward the open position). That is, when the cable release 202 is in the engaged state, the tailgate 104 may freely move from the closed position toward the open position. Thus, a user of the vehicle 102 may move the tailgate 104 from a partially or fully closed position toward the open position to access cargo stored in the vehicle 102.

The cable release 202 may be placed in the engaged state or the unengaged state by a button coupled to the cable release 202. The button may be located within a cargo area of the vehicle 102 (e.g., within the truck bed of a truck), or may be located on the tailgate 104, or may be located on an exterior of the vehicle 102 (e.g., on an exterior body panel of the truck), or may be located on a graphical user interface of a mobile device or a touchscreen of the vehicle. In some embodiments, there are multiple buttons in multiple respective locations, any of which could toggle the cable release 202 between the engaged state or the unengaged state. In some embodiments, the button is a virtual button that is controlled by a voice command received by a microphone or controlled by a physical gesture received by a camera.

There may be multiple cables 206 connecting the tailgate 104 to the body of the vehicle 102 (e.g., one cable on each side of the tailgate) or there may only be one cable 206 connecting the tailgate 104 to the body of the vehicle 102. In some embodiments, there may be only one cable release 202, or there may be multiple cable releases (e.g., one on each side of the tailgate). When there is one cable 206 and one cable release 202, the cable release 202 controls the movement of the one cable 206 relative to the one cable release 202.

When there are multiple cables 206 and one cable release 202, the cable release 202 is attached to one cable of the multiple cables and controls the movement of the one cable 206 relative to the cable release 202. The remaining cables of the multiple cables may be attached to a respective spring-loaded spool.

When there are multiple cables 206 and multiple cable releases 202, the cable releases 202 may be in electrical or mechanical communication with the one or more buttons described herein so that the multiple cable releases 202 may synchronously be in the engaged state or the unengaged state.

The spool 204 and the cable release 202 may be located within the body of the vehicle in a cavity 214 defined by a vehicle liner 210 and a vehicle body outer panel 212. In this way, the spool 204 and the cable release 202 are not exposed to the outside environment and the cargo of the vehicle 102.

The cable 206 may move within cavity 214 and outside the cavity 214 via an opening 208 located on the body of the vehicle 102 facing the tailgate 104. The spool 204 and the cable release 202 may also be fixed in location in the vehicle 102.

Figure 3A:
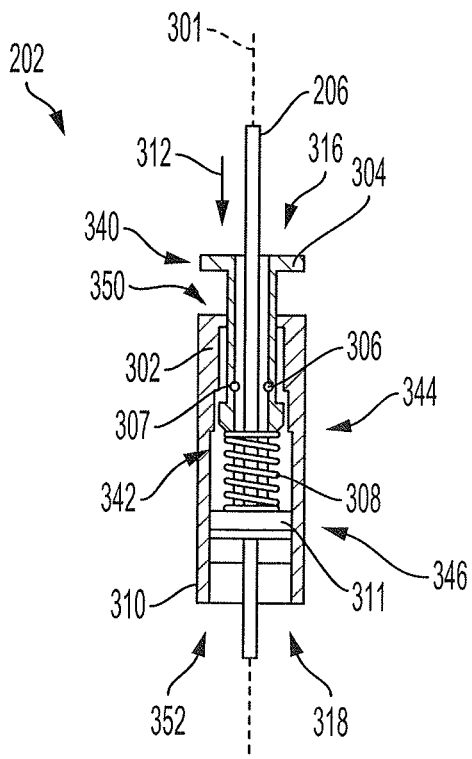
FIG. 3A illustrates a side cross-sectional view of a cable release in an engaged position, according to various embodiments of the invention.

FIG. 3A illustrates a side cross-sectional view of the cable release 202 in the unengaged state. The cable release 202 receives the cable 206 between a first end 316 (proximal to the tailgate) and a second end 318 (proximal to the spool). The cable release 202 and the cable 206 share a central axis 301. The cable 206 travels along the central axis 301, through the cable release 202. The cable release 202 is generally cylindrical in shape. Accordingly, the structures of the cable release 202 all have an annular shape about the central axis 301.

The cable release 202 includes a housing 310 configured to define a cavity and align the components within along the central axis 301. The housing 310 includes a first opening proximal 350 to the first end 316 and a second opening 352 proximal to the second end 318. The cable release 202 also includes a plunger 304 located partially within the housing 310 and extending out of the housing 310. The plunger 304 includes a first end 340 located outside of the housing 310 and a second end 342 located within the housing 310. The portions of the plunger 304 between the first end 340 and the second end 342 may move in and out of the housing 310.

The plunger 304 includes an annular channel 307 located proximal to the second end 342 and configured to receive a plurality of ball bearings 306. The ball bearings 306 move freely within the channel 307 around the central axis 301, toward the central axis 301, and away from the central axis 301. The ball bearings 306 contact the cable 206 as the cable 206 moves within the cable release 202. The ball bearings 306 reduce wear on the cable release 202 and the cable 206. The geometry and properties of the plunger 304 and the housing 310 cause the ball bearings 306 and/or the plunger 304 to tighten on the cable 206 when the plunger 304 is moved toward the first end 316 of the cable release 202, thereby limiting movement of the cable 206 within the cable release 202. For example, the plunger 304 may be configured to constrict toward the central axis 301 or expand away from the central axis 301, and the cavity of the housing 310 may have a narrower interior shape toward the first opening 350 of the housing 310 than the second opening 352 of the housing 310, such that the narrower interior shape of the housing 310 forces the plunger 304 to constrict inward around the cable 206 when the plunger 304 is moved toward the first end 316 of the cable release 202. Other geometries and properties of the plunger 304 and the housing 310 may cause the plunger 304 to tighten on the cable 206.

As described herein, movement of the cable 206 may be described with respect to movement along the central axis 301 and relative to the cable release 202.

The second end 342 of the plunger 304 contacts a spring 308 located within the housing 310. The spring 308 has a first end 344 and a second end 346. The first end 344 of the spring 308 contacts the second end 342 of the plunger 304. The second end 346 of the spring 308 contacts a plate 311 located within the housing 310. The plate 311 is stationary and fixed within the housing 310. The spring 308 imparts a spring force urging the plunger 304 toward the first end 316 of the cable release 202, thereby limiting movement of the cable 206 within the cable release 202, as described herein.

When an engaging force is applied to the plunger 304 in a releasing direction 312 (e.g., toward the second end 318 of the cable release 202), the engaging force opposes and overcomes the spring force of the spring 308, causing the plunger 304 to be moved in the releasing direction 312. This movement results in releasing of the cable 206 by the plunger 304. In addition, when the cable 206 is moved in the releasing direction 312, the frictional force between the cable 206 and the plunger 304 causes the plunger 304 to move in the releasing direction, releasing the cable 206. Thus, when the cable release 202 is in the unengaged state as shown in FIG. 3A, the cable 206 may move in the releasing direction 312 when the cable 206 is pulled in the releasing direction 312 or when an engaging force is applied to the plunger 304 in the releasing direction. In addition, when the cable release 202 is in the unengaged state as shown in FIG. 3A, the cable 206 may not move in a direction opposite to the releasing direction 312 (e.g., toward the first end 316 of the cable release 202).

Figure 3B:
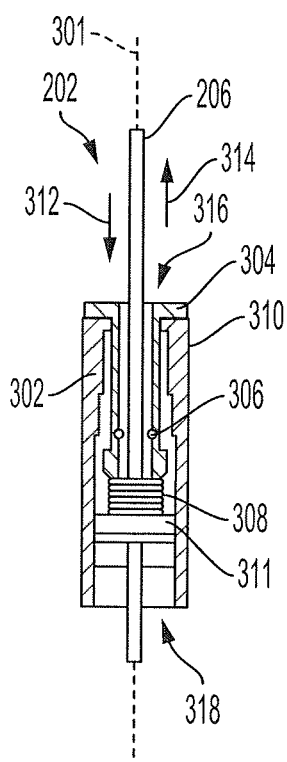
FIG. 3B illustrates a side cross-sectional view of a cable release in an unengaged position, according to various embodiments of the invention.

Applying the engaging force to the plunger 304 results in moving the cable release 202 from the unengaged state shown in FIG. 3A to the engaged state shown in FIG. 3B. As shown in FIG. 3B, the engaging force has caused the plunger 304 to be moved fully in the releasing direction 312, releasing the cable 206. Thus, the cable 206 does not make contact with the plunger 304 and the cable 206 is capable of free movement 314 with respect to the cable release 202. The spring 308 is more compressed than in FIG. 3A, as the engaging force has overcome the spring force of the spring 308.

When the engaging force is removed from the plunger 304, the spring force of the spring 308 urges the plunger 304 toward the first end 316 of the cable release 202.

The engaging force applied to the plunger 304 may be made by one or more actuators activated by a user, or the engaging force applied to the plunger 304 may be made by the user engaging a button, with the force applied to the button translated using one or more devices to the engaging force applied to the plunger 304.

Figure 3C:
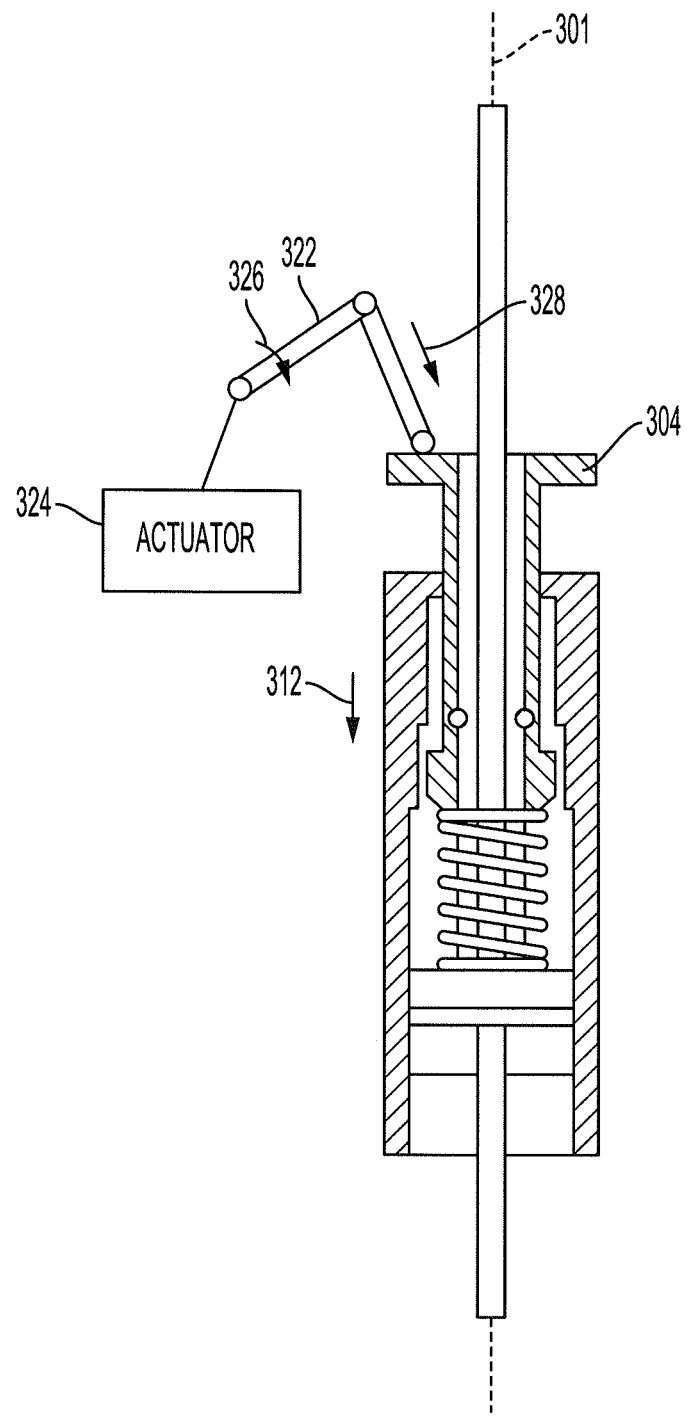
FIG. 3C illustrates a side cross-sectional view of a cable release and motorized movement of the plunger, according to various embodiments of the invention.

FIG. 3C illustrates a possible embodiment using an actuator to apply (and remove) the engaging force to the plunger 304. The plunger 304 may be connected to a first arm 320 and a second arm 322, with the second arm 322 connected to an actuator 324. The actuator 324 may impart rotational force 326 on the second arm 322, which may be translated to the first arm 320, causing force 328 onto the plunger 304 in the releasing direction 312. The actuator 324 may be connected to one or more control units (e.g., an electronic control unit) connected to one or more buttons described herein. The one or more buttons may cause the one or more control units to communicate an instruction to the actuator 324 to apply (or remove) the engaging force to the plunger 304. The engaging force may be removed from the plunger 304 by reversing the movement of the actuator.

Figure 4A:
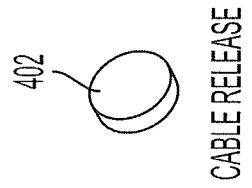
FIGS. 4A-4B illustrate a cable release button and movement of the tailgate from an open position to a closed position, according to various embodiments of the invention.
Figure 4B:
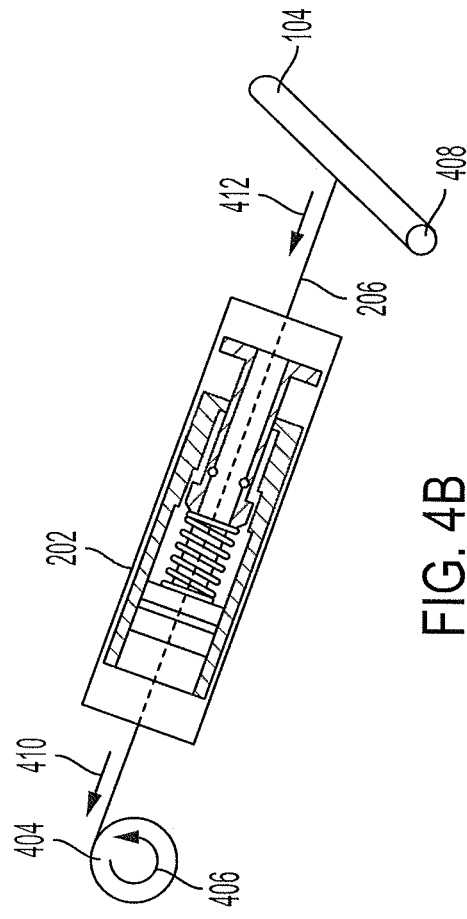

FIGS. 4A and 4B illustrate use of the tailgate open position adjustment system using a cable release button 402 similar to the one or more buttons described herein to toggle the cable release 202 between the engaged and unengaged state.

The cable release button 402 shown in FIG. 4A is not pressed or engaged. FIG. 4B illustrates a spool 404 similar to spool 204, a cable release 202, a cable 206 connected to the spool 404, passing through the cable release 202, and connected to the tailgate 104. The spool 404 is a spring-loaded spool having a spring urging automatic rotation of the spool 404 in a winding direction 406. The winding direction 406 causes the cable 206 to be wound around the spool 404. The cable release 202 is in the unengaged state, so the cable 206 may travel only in a direction 410 toward the spool 404. Movement of the cable 206 away from the spool 404 is prevented when force is applied to the cable 206 from the tailgate 104. This is shown further herein in FIG. 3A by the cable 206 being able to move only in the releasing direction 312 in FIG. 3A when the cable release 202 is in the unengaged state.

The tailgate 104 rotates about a hinge 408. The spring of the spool 404 is tuned so that the spring force of the spring of the spool 404 does not overcome the weight of the tailgate 104. Thus, when no force is applied to the tailgate 104, the tailgate 104 remains in a stationary position. The tailgate 104 does not move further toward the open position because of the cable release 202 holding the cable 206 in place (via the plunger making contact with the cable 206). This allows the tailgate 104 to secure cargo of the vehicle 102, as illustrated in FIG. 1. If the user desired to move the tailgate 104 toward the closed position by applying a closing force 412, the tailgate 104 would close, as the cable release 202 allows for movement of the cable 206 in the releasing direction, and the spool 404 winds the cable 206 around the spool 404. This allows the user to move the tailgate 104 to the closed position to snugly secure the cargo within the vehicle 102, and the tailgate 104 retains its position automatically.

Figure 5A:
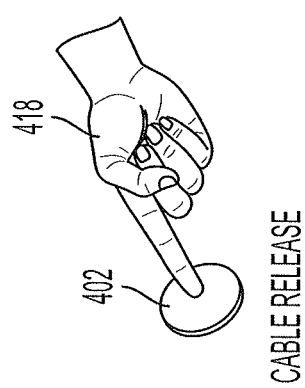
FIGS. 5A-5B illustrate a cable release button and movement of the tailgate from a closed position to an open position, according to various embodiments of the invention.
Figure 5B:
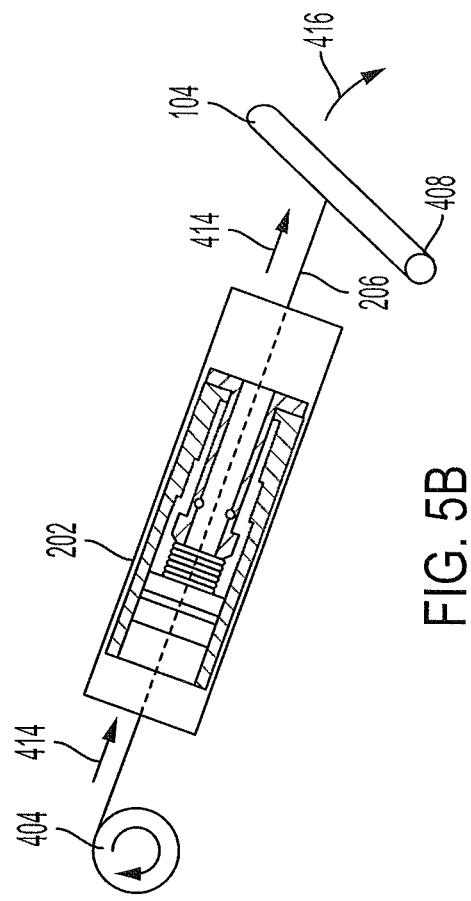

FIGS. 5A and 5B illustrate use of the tailgate open position adjustment system using a cable release button 402 similar to the one or more buttons described herein to toggle the cable release 202 between the engaged and unengaged state.

The cable release button 402 shown in FIG. 5A is pressed or engaged by a user 418. This causes the cable release 202 to be in the engaged state. For example, an actuator may, in response to the cable release button 402 being pressed, cause force to be applied to the plunger of the cable release 202, resulting in the cable release 202 being in the engaged state.

FIG. 5B illustrates a spool 404 similar to spool 204, a cable release 202, a cable 206 connected to the spool 404, passing through the cable release 202, and connected to the tailgate 104. The cable release 202 is in the engaged state, so the cable 206 may travel in a direction 414 away from the spool 404. This is shown further herein in FIG. 3B by the cable 206 being able to move freely when the cable release 202 is in the engaged state.

The tailgate 104 rotates about a hinge 408. The weight of the tailgate 104 overcomes the spring force of the spring of the spool 404, resulting in the tailgate 104 moving toward the open position. Thus, when the cable release button 402 is pressed and no additional force is applied to the tailgate 104, the tailgate 104 naturally moves toward the open position. The spring force of the spring of spool 404 may prevent the tailgate 104 from opening suddenly and potentially dangerously. In addition, if the user applies additional force 416 to move the tailgate 104 toward the open position, the tailgate 104 may open faster than if no additional force 416 were applied. When the user 418 pushes the cable release button 402, the user is able to retrieve the cargo in the vehicle.

FIGS. 6A and 6B illustrate use of the tailgate open position adjustment system using a tailgate raise button 602 and a tailgate lower button 603 similar to the one or more buttons described herein to toggle the cable release 202 between the engaged and unengaged state. As shown in FIG. 6A, when a user 618 presses the tailgate raise button 602, the tailgate 104 moves from the open position to the closed position.

FIG. 6B illustrates a spool 604 similar to spool 204, a cable release 202, a cable 206 connected to the spool 604, passing through the cable release 202, and connected to the tailgate 104. The spool 604 is motorized spool capable of being rotated in a winding direction or an unwinding direction. The winding direction 606 causes the cable 206 to be wound around the spool 604. The cable release 202 is in the unengaged state, so the cable 206 may travel only in a direction 610 toward the spool 604. This is shown further herein in FIG. 3A by the cable 206 being able to move only in the releasing direction 312 in FIG. 3A when the cable release 202 is in the unengaged state. In some embodiments, the motorized spool includes a sensor configured to detect pressure and/or resistance by the cable indicating that the tailgate may not be closed further (e.g., the tailgate is in the fully closed position, or the tailgate is fully engaged by cargo in the vehicle and the cargo prevents further closure of the tailgate). When the sensor detects the tailgate may not be closed further, the motorized spool may automatically cease to continue winding the cable 206, even if a corresponding button to wind the cable and close the tailgate is being pressed.

The tailgate 104 rotates about a hinge 608. When the tailgate raise button 602 is released, the tailgate 104 remains in a stationary position. The tailgate 104 does not move further toward the open position because of the cable release 202 holding the cable 206 in place (via the plunger making contact with the cable 206) and the motorized spool maintaining the length of the wound cable 206. This allows the tailgate 104 to secure cargo of the vehicle 102, as illustrated in FIG. 1.

If the user desired to close the tailgate 104 further, the user would press the tailgate raise button 602 until the desired tailgate position. In some embodiments, the system includes a tailgate position sensor configured to detect a degree to which the tailgate 104 is open. If an external closing force 612 is applied without the tailgate raise button 602 being pressed, the tailgate position sensor would be able to detect this movement, and the spool 604 may be automatically rotated in the winding direction 606. This may prevent slack in the cable 206 between the spool 604 and the tailgate 104.

FIGS. 7A and 7B illustrate use of the tailgate open position adjustment system using a tailgate raise button 602 and a tailgate lower button 603 similar to the one or more buttons described herein to toggle the cable release 202 between the engaged and unengaged state. As shown in FIG. 7A, when a user 618 presses the tailgate lower button 603, the tailgate 104 moves from the closed position to the open position. In addition, when the user 618 presses the tailgate lower button 603, the cable release 202 is put in the engaged state. For example, an actuator may, in response to the tailgate lower button 603 being pressed, cause force to be applied to the plunger of the cable release 202, resulting in the cable release 202 being in the engaged state. A control unit (e.g., an electronic control unit) may be responsible for engaging the actuator and moving the spool when the tailgate lower button 603 is pressed. In some embodiments, when the tailgate lower button 603 ceases being pressed, the cable release 202 is returned to an unengaged state.

FIG. 7B illustrates a spool 604 similar to spool 204, a cable release 202, a cable 206 connected to the spool 604, passing through the cable release 202, and connected to the tailgate 104. The spool 604 is motorized spool capable of being rotated in a winding direction or an unwinding direction. The unwinding direction 620 causes the cable 206 to be unwound around the spool 604. The cable release 202 is in the engaged state, so the cable 206 may travel in a direction 614 away from the spool 604. This is shown further herein in FIG. 3B by the cable 206 being able to move freely when the cable release 202 is in the engaged state.

The tailgate 104 rotates about a hinge 608, and the tailgate 104 moves toward the open position in an opening direction 616. The tailgate 104 may lower in a steady and controlled manner, as the spool 604 turns in the unwinding direction 620.

As compared to the system shown in FIG. 5B, if the user applies additional force to move the tailgate 104 toward the open position, the tailgate 104 may not open faster, as the spool 604 may maintain a consistent movement in the unwinding direction 620. When the user 618 pushes the tailgate lower button 603, the user is able to retrieve the cargo in the vehicle.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for adjusting a position of a tailgate of a vehicle, the system comprising:
   a cable connecting the tailgate to a spool, the spool configured to turn in a first direction to wind the cable around the spool, and turn in a second direction to unwind the cable from the spool;
   a cable release located between the spool and the tailgate, the cable passing through the cable release, the cable release configured to be in an engaged state or an unengaged state, the cable release, when in the unengaged state, allowing the cable to move through the cable release when the spool turns in the first direction to wind the cable around the spool, and preventing movement of the cable through the cable release when force is applied to the cable from the tailgate, and the cable release, when in the engaged state, allowing the cable to move through the cable release when the spool turns in the second direction to unwind the cable around the spool; and
   a button coupled to the cable release and configured to toggle the cable release between the engaged state and the unengaged state when the button is pressed.

2. The system of claim 1, wherein the spool is a spring-loaded spool configured to automatically turn in the first direction to wind the cable around the spool, and
   wherein the button is a single button configured to toggle the cable release between the engaged state and the unengaged state.

3. The system of claim 1, wherein the spool is a motorized spool configured to turn in the first direction or the second direction, and
   wherein the button includes a first button and a second button, pressing of the first button causing the spool to turn in the first direction, and pressing of the second button causing the cable release to be in the engaged state and causing the spool to turn in the second direction.

4. The system of claim 3, wherein ceasing pressing of the second button causes the cable release to be in the unengaged state.

5. The system of claim 1, wherein the cable release includes a first end proximal to the tailgate, a second end proximal to the spool, a housing, a plunger, and a spring axially located along a central axis and surrounding the cable,
   wherein the housing includes a first opening proximal to the first end and a second opening proximal to the second end, and defines a cavity,
   wherein the plunger is partially located within the cavity, extends out of the first opening of the housing, and is configured to move along the central axis and prevent movement of the cable when the plunger is moved toward the first end of the cable release, and allow movement of the cable when the plunger is moved toward the second end of the cable release,
   wherein the spring is located within the cavity and connected to the plunger, and configured to urge the plunger along the central axis, toward the first end of the cable release,
   wherein the cable release is moved from the unengaged state to the engaged state when a force is applied to the plunger toward the second end of the cable release in a direction opposing a force of the spring, and
   wherein the cable release is moved from the engaged state to the unengaged state by the spring when the force applied to the plunger is removed.

6. The system of claim 5, wherein the cavity defined by the housing has a narrower interior shape proximal to the first opening than the second opening, and
   wherein the narrower interior shape causes the plunger to prevent movement of the cable when the plunger is moved toward the first end of the cable release.

7. The system of claim 5, further comprising an actuator coupled to the button and the plunger of the cable release, and configured to apply or remove the force toward the second end of the cable release in the direction opposing the force of the spring.

8. The system of claim 1, wherein the spool and the cable are located between an inner liner of the vehicle and a body outer panel of the vehicle and protected from cargo of the vehicle.

9. The system of claim 8, wherein the button is located on the inner liner of the vehicle or the body outer panel of the vehicle.

10. The system of claim 1, wherein the button is located on the tailgate.

11. A vehicle with an adjustable tailgate, the vehicle comprising:
    a cable connecting the tailgate to a spool, the spool configured to turn in a first direction to wind the cable around the spool, and turn in a second direction to unwind the cable from the spool;
    a cable release located between the spool and the tailgate, the cable passing through the cable release, the cable release configured to be in an engaged state or an unengaged state, the cable release, when in the unengaged state, allowing the cable to move through the cable release when the spool turns in the first direction to wind the cable around the spool, and preventing movement of the cable through the cable release when force is applied to the cable from the tailgate, and the cable release, when in the engaged state, allowing the cable to move through the cable release when the spool turns in the second direction to unwind the cable around the spool; and
    a button coupled to the cable release and configured to toggle the cable release between the engaged state and the unengaged state when the button is pressed.

12. The vehicle of claim 11, wherein the spool is a spring-loaded spool configured to automatically turn in the first direction to wind the cable around the spool, and
wherein the button is a single button configured to toggle the cable release between the engaged state and the unengaged state.

13. The vehicle of claim 11, wherein the spool is a motorized spool configured to turn in the first direction or the second direction, and
wherein the button includes a first button and a second button, pressing of the first button causing the spool to turn in the first direction, and pressing of the second button causing the cable release to be in the engaged state and causing the spool to turn in the second direction.

14. The vehicle of claim 13, wherein ceasing pressing of the second button causes the cable release to be in the unengaged state.

15. The vehicle of claim 11, wherein the cable release includes a first end proximal to the tailgate, a second end proximal to the spool, a housing, a plunger, and a spring axially located along a central axis and surrounding the cable,
wherein the housing includes a first opening proximal to the first end and a second opening proximal to the second end, and defines a cavity,
wherein the plunger is partially located within the cavity, extends out of the first opening of the housing, and is configured to move along the central axis and prevent movement of the cable when the plunger is moved toward the first end of the cable release, and allow movement of the cable when the plunger is moved toward the second end of the cable release,
wherein the spring is located within the cavity and connected to the plunger, and configured to urge the plunger along the central axis, toward the first end of the cable release,
wherein the cable release is moved from the unengaged state to the engaged state when a force is applied to the plunger toward the second end of the cable release in a direction opposing a force of the spring, and
wherein the cable release is moved from the engaged state to the unengaged state by the spring when the force applied to the plunger is removed.

16. The vehicle of claim 15, wherein the cavity defined by the housing has a narrower interior shape proximal to the first opening than the second opening, and
wherein the narrower interior shape causes the plunger to prevent movement of the cable when the plunger is moved toward the first end of the cable release.

17. The vehicle of claim 15, further comprising an actuator coupled to the button and the plunger of the cable release, and configured to apply or remove the force toward the second end of the cable release in the direction opposing the force of the spring.

18. The vehicle of claim 11, wherein the spool and the cable are located between an inner liner of the vehicle and a body outer panel of the vehicle and protected from cargo of the vehicle.

19. The vehicle of claim 18, wherein the button is located on the inner liner of the vehicle or the body outer panel of the vehicle.

20. The vehicle of claim 11, wherein the button is located on the tailgate.

* * * * *